(12) United States Patent
Noh et al.

(10) Patent No.: US 7,553,046 B2
(45) Date of Patent: Jun. 30, 2009

(54) LCD DEVICE WITH DIRECT BACKLIGHT UNIT HAVING LIGHT EMITTING CLUSTERS

(75) Inventors: Ji-whan Noh, Suwon-si (KR); Tae-hee Cho, Seoul (KR); Jong-min Wang, Seongnam-si (KR); Su-gun Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 11/374,185

(22) Filed: Mar. 14, 2006

(65) Prior Publication Data

US 2006/0205242 A1 Sep. 14, 2006

Related U.S. Application Data

(60) Provisional application No. 60/661,036, filed on Mar. 14, 2005.

(30) Foreign Application Priority Data

Jun. 23, 2005 (KR) ...................... 10-2005-0054502

(51) Int. Cl.
  *F21S 13/14* (2006.01)
  *F21V 9/00* (2006.01)
  *H01L 31/12* (2006.01)
  *H01L 29/20* (2006.01)

(52) U.S. Cl. .......................... 362/252; 362/231; 362/97; 257/89; 349/64

(58) Field of Classification Search .................... 362/97, 362/612, 231, 246, 249, 252; 349/64; 257/89
See application file for complete search history.

(56) References Cited

U.S. PATENT DOCUMENTS

| | | | |
|---|---|---|---|
| 5,688,551 A * | 11/1997 | Littman et al. | 427/64 |
| 6,485,884 B2 * | 11/2002 | Wolk et al. | 430/200 |
| 6,627,332 B2 * | 9/2003 | Utsugi et al. | 428/690 |
| 6,628,067 B2 * | 9/2003 | Kobayashi et al. | 313/504 |
| 6,633,124 B2 * | 10/2003 | Himeshima et al. | 313/506 |
| 6,975,065 B2 * | 12/2005 | Yamada et al. | 313/504 |
| 7,284,874 B2 * | 10/2007 | Jeong et al. | 362/97 |
| 2001/0035922 A1 * | 11/2001 | Park et al. | 349/65 |
| 2002/0109457 A1 * | 8/2002 | Duineveld et al. | 313/504 |
| 2007/0085092 A1 * | 4/2007 | Chen | 257/89 |

FOREIGN PATENT DOCUMENTS

| | | |
|---|---|---|
| EP | 1 669 796 A1 | 6/2006 |
| JP | 10-39301 A | 2/1998 |
| JP | 2004-29802 A | 1/2004 |
| KR | 2000-0064947 A | 11/2000 |
| KR | 10-2005-0007625 A | 1/2005 |
| WO | WO 00/11728 A1 | 3/2000 |

* cited by examiner

*Primary Examiner*—Ismael Negron
(74) *Attorney, Agent, or Firm*—Sughrue Mion, PLLC

(57) ABSTRACT

A light emitting cluster includes five light emitting devices including two first light emitting devices producing first color light, two second light emitting devices producing second color light, and a third light emitting device producing third color light, wherein one of the first light emitting devices, one of the second light emitting devices, the third light emitting device, one of the first light emitting devices, and one of the second light emitting devices are arranged sequentially. An LCD panel is back illuminated by a plurality of light emitting clusters.

22 Claims, 7 Drawing Sheets

LCD DEVICE WITH DIRECT BACKLIGHT UNIT HAVING LIGHT EMITTING CLUSTERS

CROSS-REFERENCE TO RELATED PATENT APPLICATIONS

This application claims priority from Korean Patent Application No. 10-2005-0054502, filed on Jun. 23, 2005 in the Korean Intellectual Property Office, and U.S. Provisional Application No. 60/661,036, filed on Mar. 14, 2005 in the U.S. Patent and Trademark Office, the disclosures of which are incorporated herein in their entirety by reference.

BACKGROUND OF THE INVENTION

1. Field of the Invention

The present invention relates to a backlight unit and a liquid crystal display (LCD) device having the same, and more particularly, to a light emitting cluster, a direct light emitting type backlight unit having the same, and an LCD device having the backlight unit.

2. Description of the Related Art

LCD devices, which are a type of flat panel display, are light receiving type displays that are not self-luminescent but form an image using incident light from the outside. Backlight units are installed on a rear side of the LCD device and radiate light onto a liquid crystal panel.

Backlight units can be mainly classified into direct light emitting type backlight units that radiate light emitted from a plurality of light sources directly installed under an LCD device onto a liquid crystal panel, and edge light emitting type backlight units that transmit light emitted from a light source installed at sidewalls of a light guide panel (LGP) onto the liquid crystal panel, according to the arrangement of a light source.

In the direct light emitting type backlight units, a light emitting diode (LED) that emits Lambertian light can be used as a point light source.

FIG. 1 shows an arrangement of LEDs in a conventional direct light emitting type backlight unit in which the LEDs are used as a point light source. Referring to FIG. 1, LED clusters 5 are arranged on a printed circuit board (PCB) 1 to form a plurality of lines. Two LEDs 5R producing red light R, two LEDs 5G producing green light G, and an LED 5B producing blue light B are included in each of the LED clusters 5 so as to realize white light fitted to color temperature. The five LEDs 5R, 5G, and 5B are arranged in a row in an order of R, G, B, G, and R. Thus, approximately white light is produced by each of the LED clusters 5.

The LED clusters 5 are disposed in lines on the PCB 1 and are separated by a predetermined distance D'. The distance D' between the LED clusters 5 is generally larger than a distance d' between the LEDs 5R, 5G, and 5B in each of the LED clusters 5. The distance D' between the LED clusters 5 corresponds to a distance between an LED placed in a last position of one of the LED clusters 5 and an LED placed in a first position of the next LED cluster 5. The distance between lines is much larger than the distance d' between the LEDs 5R, 5G, and 5B in each line.

In the conventional backlight unit having the arrangement of LEDs as described above, the red LEDs 5R are placed at opposite ends of the two LED clusters 5. Thus, as indicated in long square box A in FIG. 1, a portion where the red LEDs 5R are adjacent appears.

In the conventional LED arrangement described above, due to the existence of the portion where the red LEDs 5R are adjacent, a red light line is formed in a direction perpendicular to the lines of LEDs.

FIG. 2 is a graph of light intensity detected by extracting only red light from white light obtained from the LED arrangement of FIG. 1. In FIG. 2, the horizontal axis represents a position along a line, and the vertical axis represents the intensity of red light in arbitrary units. A plurality of peaks exist in the graph of FIG. 2. The peaks represent the existence of the red light lines.

Due to the existence of the red light lines, a thicker diffusion plate is needed to smoothly mix colors. As such, the thickness of the backlight unit is increased.

SUMMARY OF THE INVENTION

The present invention provides a light emitting cluster in which an arrangement of LEDs is improved so that, when a plurality of the light emitting clusters are arranged in a plurality of lines, LEDs producing identical color light are not adjacent to one another; a backlight unit having the same; and an LCD device having the backlight unit.

According to an aspect of the present invention, there is provided a light emitting cluster comprising five light emitting devices including two first light emitting devices producing first color light, two second light emitting devices producing second color light, and a third light emitting device producing third color light, wherein one of the first light emitting devices, one of the second light emitting devices, the third light emitting device, one of the first light emitting devices, and one of the second light emitting devices are arranged sequentially.

Any one of the first and second light emitting devices may produce green light and the other light emitting device may produce red light, and the third light emitting device may produce blue light.

The first through third light emitting devices may be LEDs or organic LEDs (OLEDs).

According to another aspect of the present invention, there is provided a backlight unit comprising a plurality of light emitting clusters arranged on a base plate to form a plurality of lines, wherein each of the light emitting clusters comprises five light emitting devices including two first light emitting devices producing first color light, two second light emitting devices producing second color light, and a third light emitting device producing third color light, wherein one of the first light emitting devices, one of the second light emitting devices, the third light emitting device, one of the first light emitting devices, and one of the second light emitting devices are arranged sequentially.

The light emitting clusters may be separated so that a region in which one light emitting device is to be disposed to correspond to a distance between the light emitting devices in the light emitting clusters exists.

The backlight unit may further include a first transmission diffusion plate diffusing and transmitting incident light from the light emitting devices.

The backlight unit may further include: an optical plate; and a reflection mirror pattern formed on one surface of the optical plate to reflect light traveling directly upward from the light emitting devices.

The backlight unit may further include at least one of a brightness enhancement film for enhancing directivity of light emitted from the first transmission diffusion plate and a polarization enhancement film for enhancing polarization efficiency.

According to another aspect of the present invention, there is provided an LCD device, the LCD device including: a liquid crystal panel; and a backlight unit radiating light onto the liquid crystal panel.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
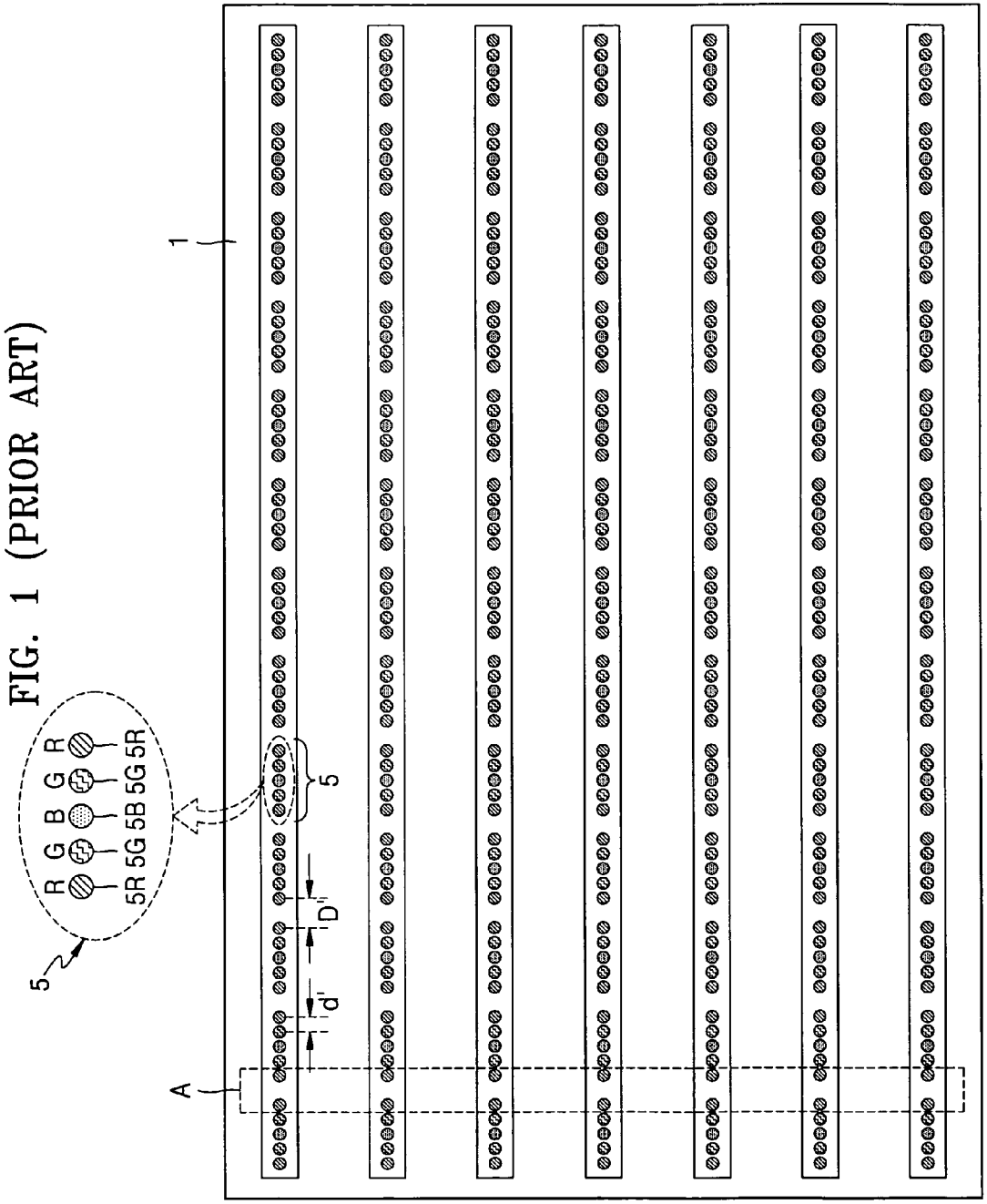
FIG. 1 shows an arrangement of LEDs of a conventional direct light emitting type backlight unit in which the LEDs are used as point light sources.
Figure 2:
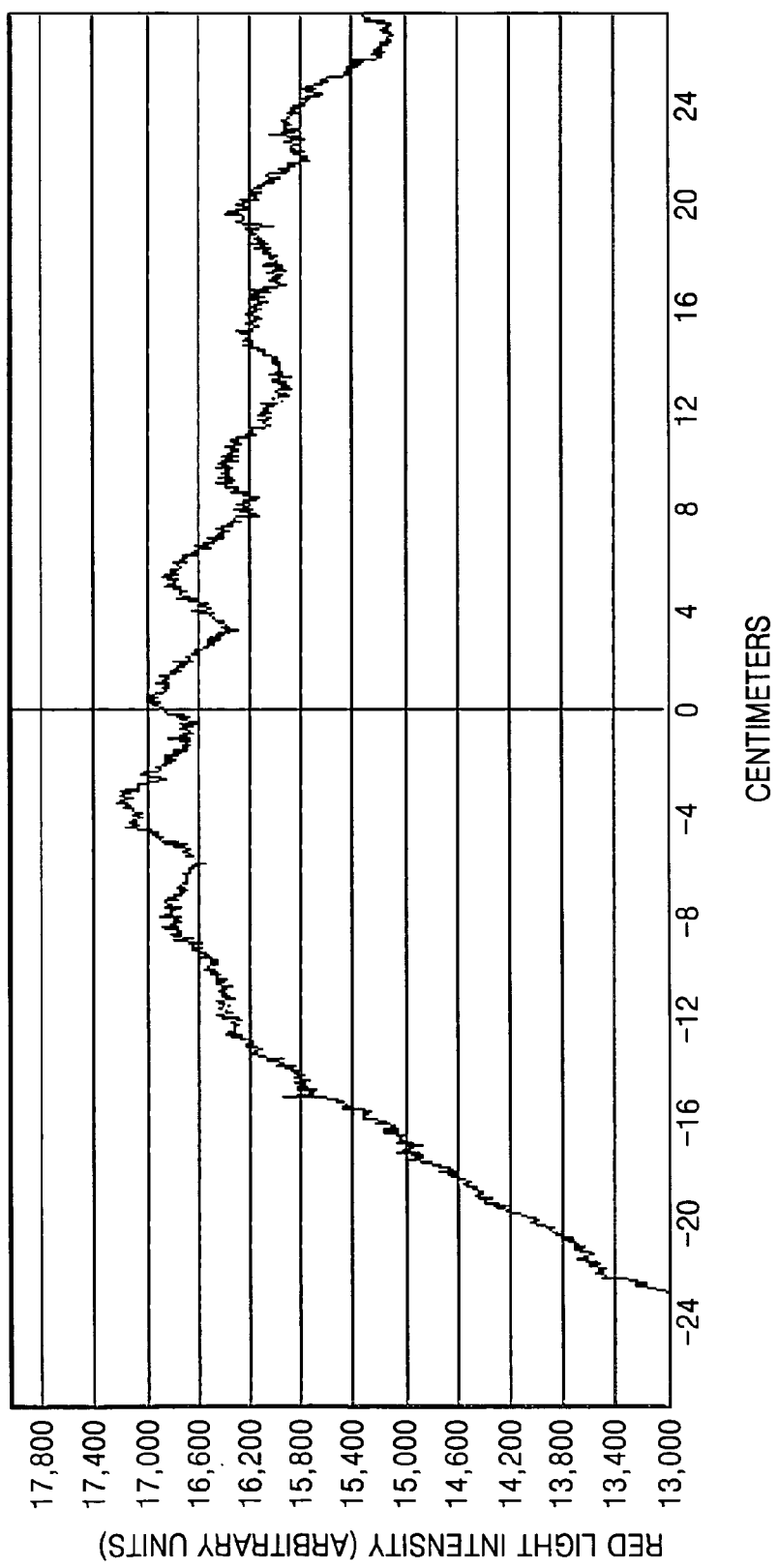
FIG. 2 is a graph of light intensity detected by extracting only red light from white light obtained from the LED arrangement of FIG. 1.

Reference will now be made in detail to the exemplary embodiments of the present invention, examples of which are illustrated in the accompanying drawings, wherein like reference numerals refer to the like elements throughout. The exemplary embodiments are described below to explain the present invention by referring to the figures.

Figure 3:
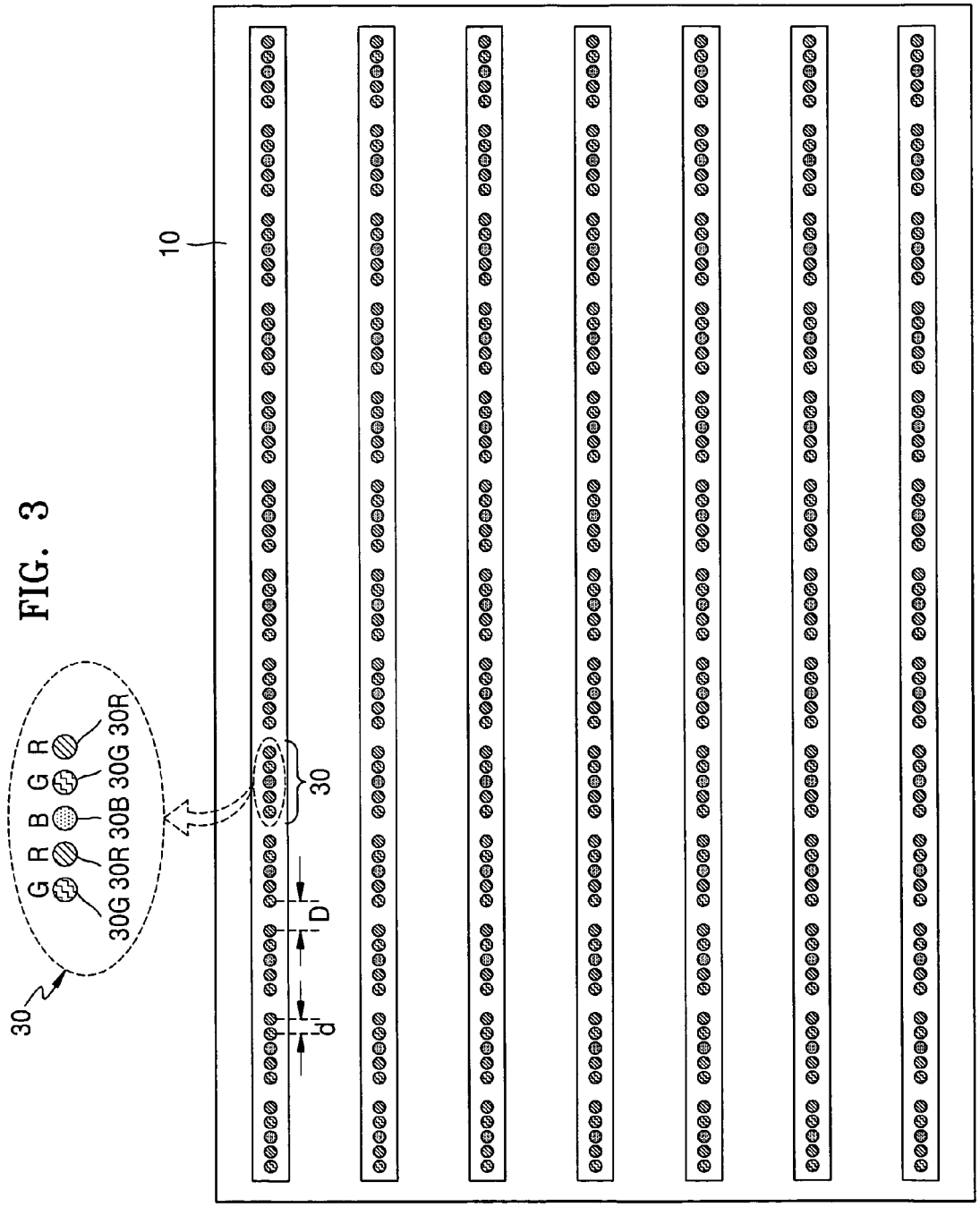
FIG. 3 shows an arrangement of light emitting devices of a direct light emitting type backlight unit when light emitting clusters according to an exemplary embodiment of the present invention are used.
Figure 4:
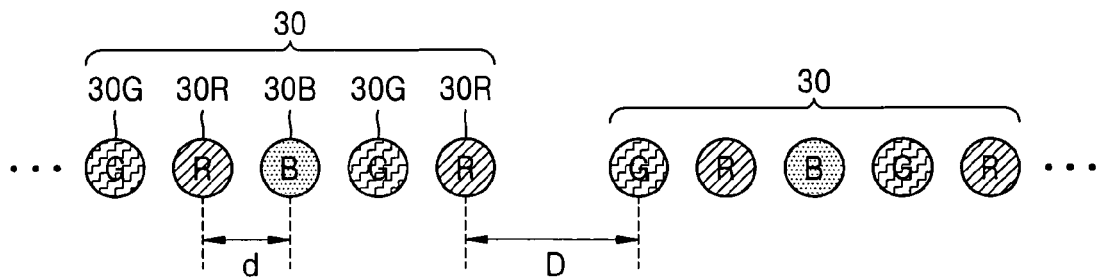
FIG. 4 is an enlarged view of a portion of the light emitting clusters of FIG. 3.

FIG. 3 shows an arrangement of light emitting devices of a direct light emitting type backlight unit when light emitting clusters 30 according to an exemplary embodiment of the present invention are used, and FIG. 4 is an enlarged view of a portion of the light emitting clusters 30 of FIG. 3.

Referring to FIGS. 3 and 4, the light emitting clusters 30 according to the present invention include five light emitting devices including two first light emitting devices 30G producing green light G, two second light emitting devices 30R producing red light R, and a third light emitting device 30B producing blue light B. The first light emitting device 30G, the second light emitting device 30R, the third light emitting device 30B, the first light emitting device LED 30G, and the second light emitting device LED 30R are arranged sequentially in each of the light emitting clusters 30. That is, the light emitting clusters 30 have the configuration in which the five light emitting devices are arranged in a row in an order of G, R, B, G, and R. Thus, approximately white light is produced approximately in each of the light emitting clusters 30.

Figure 9:
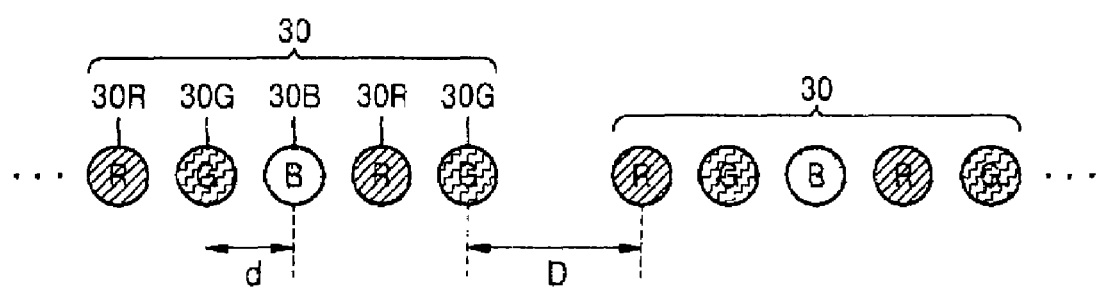
FIG. 9 is a view of a portion of the light emitting clusters according to another exemplary embodiment of the present invention.

In FIGS. 3 and 4 and the following description, the case where the five light emitting devices of the light emitting clusters 30 are arranged from left to right in an order of G, R, B, G, and R is described and illustrated. Alternatively, the five light emitting devices may be arranged in reverse order. That is, the five light emitting devices of the light emitting clusters 30 may be arranged from left to right in an order of R, G, B, R, and G as shown in FIG. 9.

When the light emitting clusters 30 are arranged on a base plate 10 to form a plurality of lines, the arrangement of the light emitting devices shown in FIG. 3 is obtained. In this case, each of the light emitting clusters 30 that form lines may be arranged in a row from left to right in an order of G, R, B, G, and R. FIG. 3 shows an example in which thirteen light emitting clusters 30 are arranged on each line to form seven lines.

Unlike in the prior art, when the light emitting clusters 30 having the above-described arrangement are arranged to form lines, the light emitting devices producing identical color light are not disposed adjacent to one another in each line.

The light emitting clusters 30 may be disposed on the base plate 10 to be separated by a constant distance D to form lines. The distance D between the light emitting clusters 30 is the distance between a light emitting device placed in the last position of one of the light emitting clusters 30 and a light emitting device placed in the first position of the next light emitting cluster 30. The distance between lines is much larger than the distance d between the light emitting devices 30R, 30G, and 30B in each of the light emitting clusters 30.

The light emitting clusters 30 are separated so that a region in which one light emitting device is to be disposed to correspond to the distance d between the light emitting devices in the light emitting clusters 30 exists. The region in which one light emitting device is to be disposed is a region between the last light emitting device of one of the light emitting clusters 30 and the first light emitting device of the next light emitting cluster 30.

Accordingly, when the distance between the light emitting devices in each of the light emitting clusters 30 is d, the light emitting clusters 30 may be separated by a distance D corresponding to a width of about 2d (i.e., D≈2d).

In this case, the distance between the first light emitting devices 30G and the distance between the second light emitting devices 30R can be maintained approximately constantly in each line.

A conventional technique of arranging LEDs and a technique of arranging light emitting devices according to the present invention will now be described.

Figure 5A:
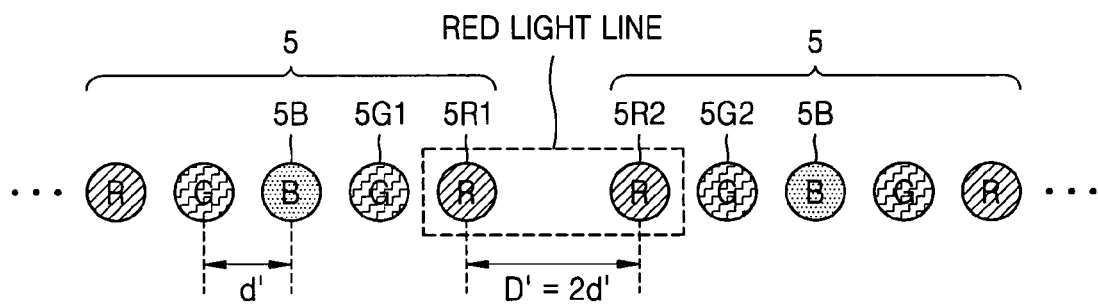
FIG. 5A illustrates a conventional technique of arranging light emitting devices.

Referring to FIGS. 1 and 5A, in the conventional technique of arranging LEDs, since the light emitting cluster 5 includes five LEDs arranged in an order of R, G, B, G, and R, even when the light emitting clusters 5 are disposed so that a region in which one light emitting device is to be disposed exists, the distance between red LEDs in the two adjacent light emitting clusters 5 is smaller than the distance between LEDs of different colors.

It is assumed that the distance between adjacent LEDs in each of the light emitting clusters 5 is a distance d' and a region between the adjacent light emitting clusters 5 is a distance D' (=2d').

In this case, the distance D' between a red LED 5R1 placed in the last position of one of the light emitting clusters 5 and a red LED 5R2 placed in the first position of the next light emitting cluster 5 is 2d'. However, the distance between green LEDs 5G1 and 5G2 that are the closest to each other is 4d' and a distance between blue LEDs 5B is 6d'.

In addition, the distance between red LEDs within each of the light emitting clusters 5 is 4d', and the distance between green LEDs is 2d'.

In the conventional technique of arranging LEDs, in the two adjacent light emitting clusters 5, the distance between red LEDs is smaller than the distance between LEDs of other colors, and red LEDs at the ends of the adjacent light emitting clusters 5 are adjacent to each other. As such, red lines exist in positions corresponding to regions between the light emitting clusters 5. In addition, in a line of the light emitting clusters 5, the red LEDs are disposed at distances of 2d', 4d', 2d', and 4d', . . . , respectively, and the green LEDs are disposed at distances of 4d', 2d', 4d', and 2d', . . . , respectively. That is, each of the red LEDs and the green LEDs are not disposed at constant distances.

Figure 5B:
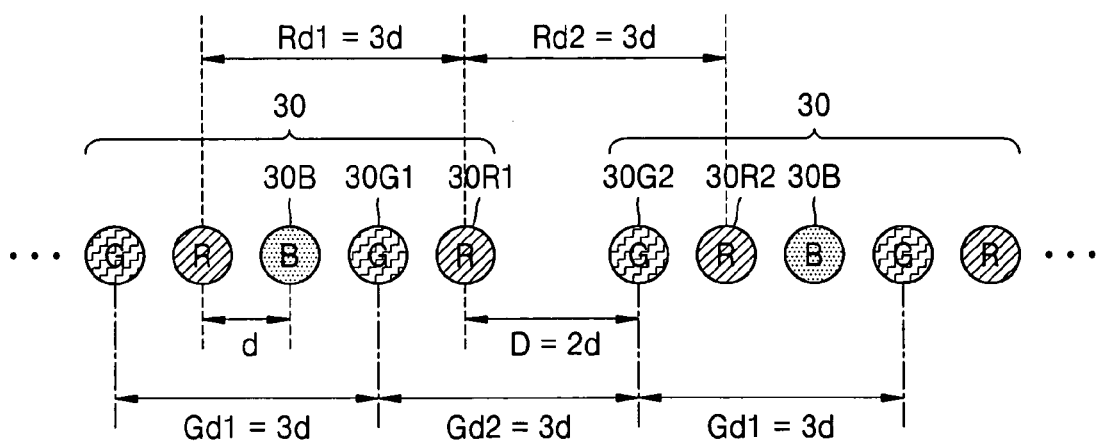
FIG. 5B illustrates a technique of arranging light emitting devices according to an exemplary embodiment of the present invention.

On the other hand, when a plurality of light emitting clusters 30 according to the present invention are arranged in lines, as shown in FIG. 5B, light emitting devices of different colors are not placed to be adjacent to one another, and the red light emitting devices and green light emitting devices can be disposed at approximately constant distances.

Referring to FIG. 5B, it is assumed that the light emitting devices are separated by an equal distance d of each of the light emitting clusters 30 and a region with a length D (=2d) exists between each adjacent pair of the light emitting clusters 30.

In this case, a distance Rd1 between red light emitting devices within the light emitting clusters 30 is 3d. In addition, a distance Rd2 between a red light emitting device 30R1 disposed in the last position of one of the light emitting cluster 30 and the closest red light emitting device 30R2 in the next light emitting cluster 30 is 3d. Similarly, a distance Gd1 between green light emitting devices within the light emitting clusters 30 is 3d. In addition, a distance Gd2 between a green light emitting device 30G2 disposed in the first position of a light emitting cluster 30 and the closest green light emitting device 30G1 in the previous light emitting cluster 30 is 3d. Blue light emitting devices 30 are disposed at equal distances of 6d.

In this way, each of the red light emitting devices and the green light emitting devices can be respectively disposed at constant distances, for example, 3d. In addition, the same overall number of green light emitting devices and red light emitting devices used in one light emitting cluster 30 are disposed in lines at equal distances.

In the light emitting clusters 30 according to the present invention and a backlight unit having the same, the light emitting devices 30R, 30G, and 30B may be LEDs that emit Lambertian light, or OLEDs.

When light emitting devices are arranged according to the present invention, since light emitting devices producing identical color light are not disposed adjacent to one another in a line, specific color light lines are not formed. In addition, the red light emitting devices, green light emitting devices, and blue light emitting devices can be respectively disposed at constant distances.

Thus, in the light emitting clusters 30 according to the present invention and the direct light emitting type backlight unit having the same, more uniform white light can be obtained so that a diffusion plate of a small thickness can be used accordingly.

Figure 6:
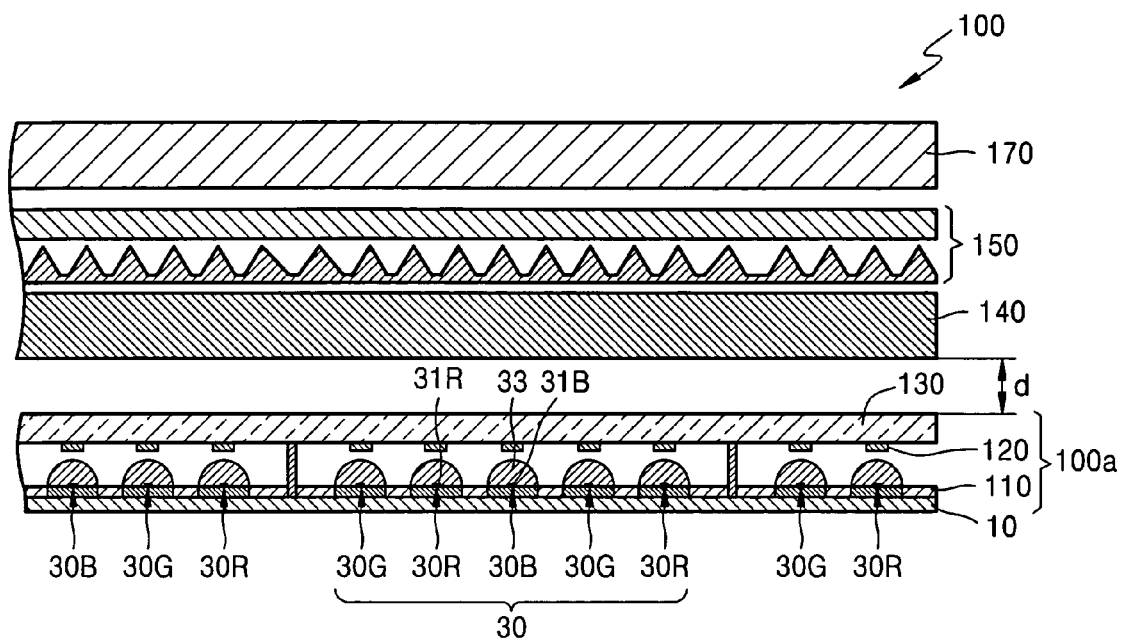
FIG. 6 is a schematic diagram of a direct light emitting type backlight unit having the arrangement of light emitting devices of FIG. 3 formed by using the light emitting clusters of the present invention according to an exemplary embodiment of the present invention.

FIG. 6 is a schematic diagram of a direct light emitting type backlight unit using the arrangement of light emitting devices of FIG. 3 according to the present invention.

Referring to FIGS. 3 and 6, a backlight unit 100 includes a plurality of light emitting clusters 30 arranged in lines on a base plate 10. Each of the light emitting clusters 30 includes five light emitting devices 30R, 30G, and 30B arranged in an order of G, R, B, G, and R, as described with reference to FIGS. 3, 4, and 5B above. Hereinafter, the case where the light emitting clusters 30 are arranged on the base plate 10 to form a plurality of lines to constitute a surface light source, as shown in FIG. 3, is referred to as a light emitting device arrangement.

The backlight unit 100 may further include a transmission diffusion plate 140 placed above the light emitting device or arrangement to diffuse and transmit incident light.

The base plate 10 serves as a substrate on which the light emitting clusters 30 are to be mounted. The base plate 10 may be a printed circuit board (PCB) in which five light emitting devices 30R, 30G, and 30B that belong to the light emitting clusters 30 are arranged and electrically connected. For example, a metal core printed circuit board (MCPCB) with good thermal conduction may be used as the base plate 10. The PCB for driving the light emitting clusters 30 may be provided separately from the base plate 10.

The light emitting devices 30R, 30G, and 30B may respectively include light emitting chips 31R, 31G, and 31B producing light and collimators 33 for collimating incident light from the light emitting chips 31R, 31G, and 31B, as shown in FIG. 6. FIG. 6 shows an example in which the collimator 33 is formed in a dome shape.

Figure 7:
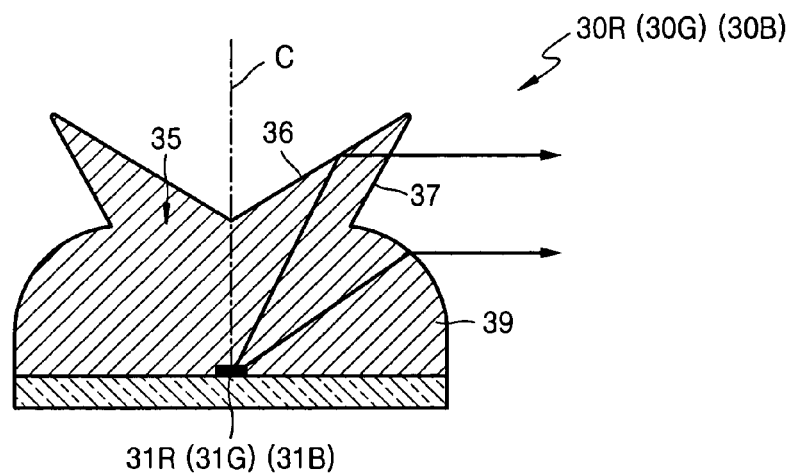
FIG. 7 is a schematic diagram of one of the light emitting devices of FIG. 6 according to another exemplary embodiment of the present invention.

Instead of the dome-shaped collimator 33, as shown in FIG. 7, the light emitting devices 30R, 30G, and 30B may include a side emitter 35 that allows incident light to travel approximately sideways.

Referring to FIG. 7, the side emitter 35 includes a transparent body made of a transparent material. For example, the side emitter 35 may include a funnel-shaped reflecting surface 36 obliquely angled with respect to a central axis C of the side emitter 35, a first refracting surface 37 obliquely angled with respect to the central axis C of the side emitter 35 to allow incident light reflected from the reflecting surface 36 to be refracted and transmitted, and a convex-shaped second refracting surface 39 extending from a bottom surface to the first refracting surface 37. Light emitted from the light emitting chip 31R, 31G, or 31B and incident on the reflecting surface 36 of the side emitter 35 is reflected from the reflecting surface 36, directed to the first refracting surface 37, and transmitted through the first refracting surface 37 and travels approximately sideways. In addition, light emitted from the light emitting chip 31R, 31G, or 31B and incident on the convex-shaped second refracting surface 39 is transmitted through the second refracting surface 39 and travels approximately sideways.

The side emitter 35 may be formed in a variety of shapes as long as light emitted from the light emitting chips 31R, 31G, and 31B is emitted approximately sideways.

Alternatively, each of the light emitting devices 30R, 30G, and 30B may include only the light emitting chips 31R, 31G, and 31B and no collimator.

The transmission diffusion plate 140 is disposed at a predetermined distance d above a lower portion 100a of the backlight unit 100. The transmission diffusion plate 140 diffuses and transmits incident light.

If the transmission diffusion plate 140 is too close to the light emitting device arrangement, a region where the light emitting clusters 30 are placed may be brighter than other regions such that brightness uniformity may be lowered. However, as the transmission diffusion plate 140 is further separated from the light emitting devices, the thickness of the backlight unit 100 increases. Thus, the distance d between the transmission diffusion plate 140 and a lower portion 100a of the backlight unit 100 may be defined to be minimized while ensuring that light can be smoothly mixed by diffusion.

The backlight unit 100 may further include a brightness enhancement film 150 for enhancing directivity of light emitted from the transmission diffusion plate 140. In addition, the backlight unit 100 may further include a polarization enhancement film 170 for enhancing polarization efficiency.

The brightness enhancement film 150 refracts and condenses light emitted from the transmission diffusion plate 140 to enhance the directivity of light, thereby enhancing brightness.

The polarization enhancement film 170 transmits, for example, p-polarized light and reflects s-polarized light so that emitted light is a single polarized light, for example, p-polarized light.

An LCD device having the backlight unit 100 includes a liquid crystal panel on the backlight unit 100. The liquid crystal panel allows a single linearly-polarized light to be incident on a liquid crystal layer of the liquid crystal panel and changes the direction of a liquid crystal director using an electric field, thereby displaying an image by changing the polarization of light that passes through the liquid crystal layer.

Since light efficiency can be increased when light incident on the liquid crystal panel is singly polarized, when the backlight unit 100 is provided with the polarization enhancement film 170 as described above, light efficiency can be enhanced.

A reflection diffusion plate 110 that allows incident light to be diffused and reflected upward may be formed on the base plate 10. The reflection diffusion plate 110 may be placed between lines.

The backlight unit 100 may further include a reflection mirror pattern 120 formed on one surface of an optical plate 130 to reflect light and prevent from traveling directly upward from the light emitting devices 30R, 30G, and 30B and to be reflected. The reflection mirror pattern 120 corresponds to an arrangement of the light emitting clusters 30. In this case, when the backlight unit 100 is viewed from above, a light spot or color is not seen from a portion in which the light emitting devices 30R, 30G, and 30B are disposed.

The optical plate 130 on which the reflection mirror pattern 120 is formed may be made of transparent PMMA that transmits incident light without any change. Alternatively, the optical plate 130 may be a transmission diffusion plate.

In the latter case, the reflection mirror pattern 120 and the light emitting devices 30R, 30G, and 30B may be spaced apart from one another by a predetermined distance. To maintain this separation, the optical plate 130 may be supported by a support 135. The support 135 supports the optical plate 130 with respect to the reflection diffusion plate 110 or the base plate 10.

When a transmission diffusion plate is used as the optical plate 130, since more diffusion of light occurs than when only the transmission diffusion plate 140 is provided, the distance between the transmission diffusion plate 140 and the light emitting devices 30R, 30G, and 30B, that is, the distance d between the transmission diffusion plate 140 and the lower portion 100a of the backlight unit 100, can be reduced and thus the thickness of the backlight unit 100 can be reduced.

In the backlight unit 100, since specific color light lines do not occur due to an arrangement of light emitting devices, a diffusion plate of a smaller thickness than in the prior art can be used and the thickness of the backlight unit 100 can be reduced. As such, the thickness of an LCD device using the backlight unit 100 as a surface light source can be reduced.

Figure 8:
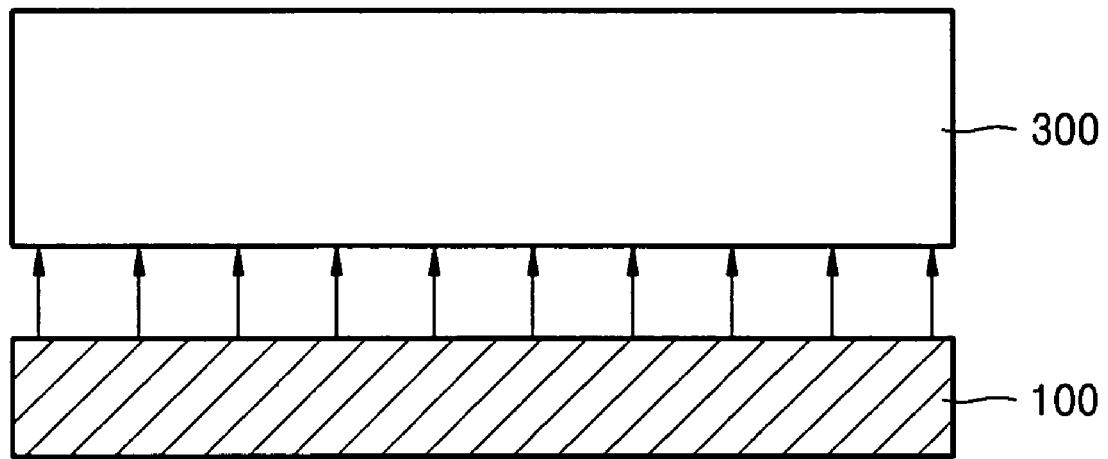
FIG. 8 is a schematic diagram of an LCD device having the backlight unit according to an exemplary embodiment of the present invention.

FIG. 8 is a schematic diagram of an LCD device having the backlight unit according to an exemplary embodiment of the present invention. Referring to FIG. 8, the LCD device includes the backlight unit 100 and a liquid crystal panel 300 disposed on the backlight unit 100. The liquid crystal panel 300 is connected to a driving circuit. The detailed configuration of the liquid crystal panel 300 and a display operation performed by circuit driving are well-known in the art, and thus, a detailed description and illustration thereof are omitted.

As described above, in the light emitting clusters according to the present invention and the direct light emitting type backlight unit including a plurality of lines formed by using the light emitting clusters, light emitting devices producing identically colored light are not adjacent to one another. Thus, a line of a predetermined color light does not exist. Thus, a thin diffusion plate can be used, and the backlight unit having a small thickness and the LCD device having the same can be realized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A plurality of light emitting clusters arranged in line, each of the light emitting clusters consisting of five light emitting devices including two first light emitting devices producing a first color light, two second light emitting devices producing a second color light, and a third light emitting device producing a third color light, wherein the five light emitting devices are arranged in a sequential order of a first one of the first light emitting devices, a first one of the second light emitting devices, the third light emitting device, a second one of the first light emitting devices, and a second one of the second light emitting devices, and wherein each of the light emitting clusters is adjacent to and separated by a predetermined distance from at least one of the other light emitting clusters so that there are no light emitting devices between adjacent light emitting clusters.

2. The plurality of light emitting clusters of claim 1, wherein the first color light is green light and the second color light is red light, and the third color light is blue light.

3. The plurality of light emitting clusters of claim 1, wherein the first color light is red light and the second color light is green light, and the third color light is blue light.

4. The plurality of light emitting clusters of claim 1, wherein the first through third light emitting devices are light emitting diodes or organic light emitting diodes.

5. A backlight unit comprising a plurality of light emitting clusters arranged on a base plate to form a plurality of lines,
   wherein each of the light emitting clusters consists of five light emitting devices including two first light emitting devices producing a first color light, two second light emitting devices producing a second color light, and a third light emitting device producing a third color light, wherein the five light emitting devices are arranged in a sequential order of a first one of the first light emitting devices, a first one of the second light emitting devices, the third light emitting device, a second one of the first light emitting devices, and a second one of the second light emitting devices and
   wherein in each of the lines, each of the light emitting clusters is adjacent to and separated by a predetermined distance from at least one of the other light emitting clusters so that there are no light emitting devices between adjacent light emitting clusters.

6. The backlight unit of claim 5, wherein the first color light is green light, and the second color light is red light, and the third color light is blue light.

7. The backlight unit of claim 5, wherein the first color light is red light, and the second color light is green light, and the third color light is blue light.

8. The backlight unit of claim 5, wherein the first through third light emitting devices are light emitting diodes or organic light emitting diodes.

9. The backlight unit of claim 5, wherein in each of the lines, each of the first light emitting devices are separated from a subsequent first light emitting device by another predetermined distance and each of the second light emitting diodes are separated from a subsequent second light emitting diode by the other predetermined distance.

10. The backlight unit of claim 5, further comprising a first transmission diffusion plate which diffuses and transmits incident light from the light emitting devices.

11. The backlight unit of claim 10, further comprising:
an optical plate; and
a reflection mirror pattern which is disposed on one surface of the optical plate and reflects light traveling directly from the light emitting devices.

12. The backlight unit of claim 10, further comprising at least one of a brightness enhancement film which enhances directivity of light emitted from the first transmission diffusion plate and a polarization enhancement film which enhances polarization efficiency.

13. A liquid crystal display device comprising:
a liquid crystal panel; and
a backlight unit which radiates light onto the liquid crystal panel,
wherein the backlight unit comprises a plurality of light emitting clusters arranged on a base plate to form a plurality of lines,
wherein each of the light emitting clusters consists of five light emitting devices including two first light emitting devices producing a first color light, two second light emitting devices producing a second color light, and a third light emitting device producing a third color light, wherein the five light emitting devices are arranged in a sequential order of a first one of the first light emitting devices, a first one of the second light emitting devices, the third light emitting device, a second one of the first light emitting devices, and a second one of the second light emitting devices, and
wherein in each of the lines, each of the light emitting clusters is adjacent to and separated by a predetermined distance from at least one of the other light emitting clusters so that there are no light emitting devices between adjacent light emitting clusters.

14. The liquid crystal display device of claim 13, wherein the first color light is green light, the second color light is red light, and the third color light is blue light.

15. The liquid crystal display device of claim 13, wherein the first color light is red light, the second color light is green light, and the third color light is blue light.

16. The liquid crystal display device of claim 13, wherein the first through third light emitting devices are light emitting diodes or organic light emitting diodes.

17. The liquid crystal display device of claim 13, wherein in each of the lines, each of the first light emitting devices are separated from a subsequent first light emitting device by another predetermined distance and each of the second light emitting diodes are separated from a subsequent second light emitting diode by the other predetermined distance.

18. The liquid crystal display device of claim 13, further comprising a first transmission diffusion plate which diffuses and transmits incident light from the light emitting devices.

19. The liquid crystal display device of claim 18, wherein the backlight unit further comprises:
an optical plate; and
a reflection mirror pattern which is disposed on one surface of the optical plate and reflects light traveling directly from the light emitting devices.

20. The liquid crystal display device of claim 18, wherein the backlight unit further comprises at least one of a brightness enhancement film which enhances directivity of light emitted from the first transmission diffusion plate and a polarization enhancement film which enhances polarization efficiency.

21. A plurality of light emitting clusters arranged in line, each light emitting cluster comprising five light emitting devices including two first light emitting devices producing a first color light, two second light emitting devices producing a second color light, and a third light emitting device producing a third color light, wherein the five light emitting devices are arranged in a sequential order of a first one of the first light emitting devices, a first one of the second light emitting devices, the third light emitting device, a second one of the first light emitting devices, and a second one of the second light emitting devices, wherein the first through third light emitting devices are light emitting diodes or organic light emitting diodes, and wherein in each of the lines, each of the light emitting clusters is adjacent to and separated by a predetermined distance from at least one of the other light emitting clusters so that there are no light emitting elements between adjacent light emitting clusters.

22. The backlight unit of claim 21, wherein the distance between each of the cluster is greater than a distance between each of the light emitting devices in the cluster.

* * * * *